Patented Oct. 8, 1946

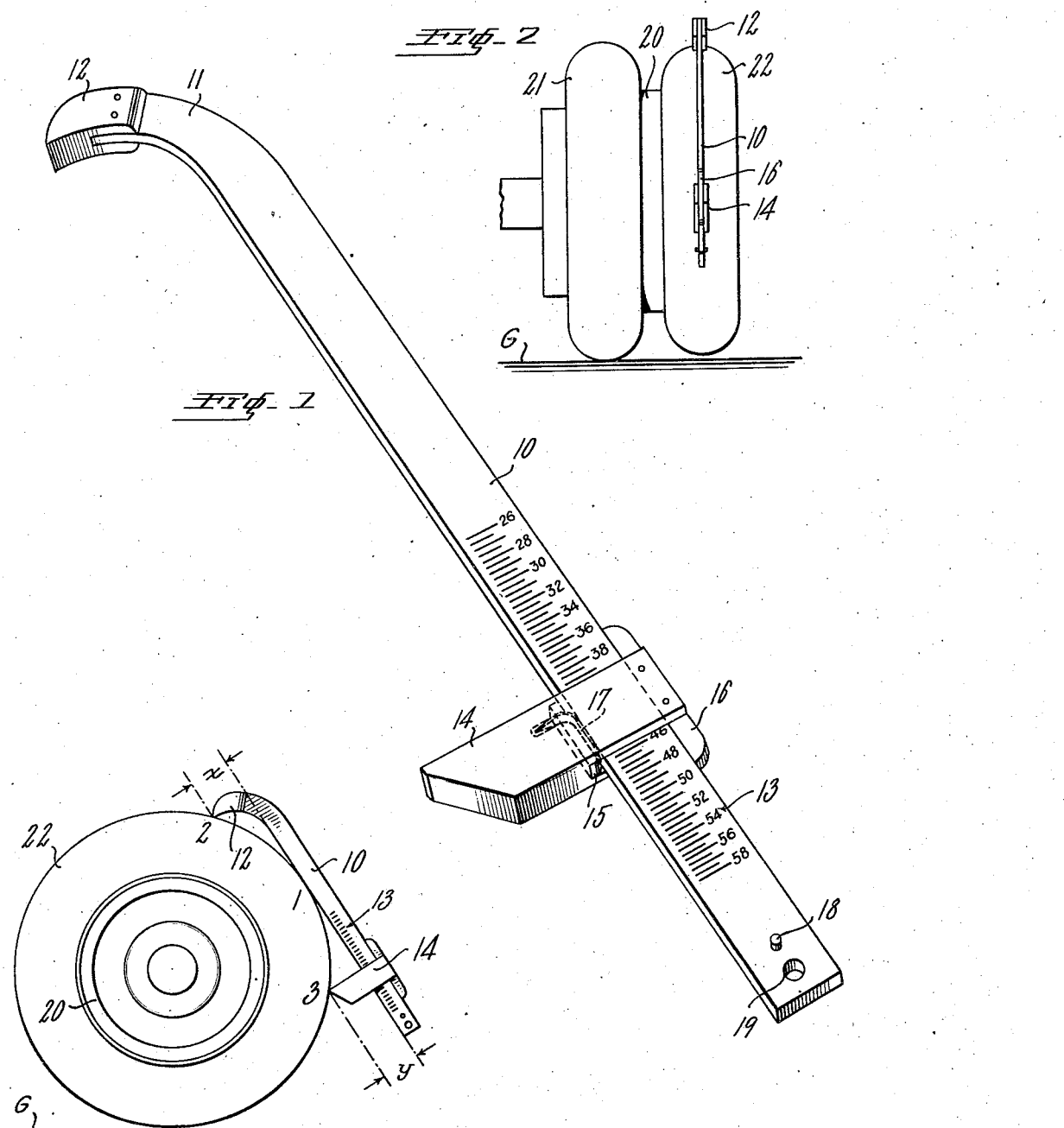

2,408,746

UNITED STATES PATENT OFFICE 2,408,746

APPARATUS FOR MEASURING TIRES

Ralph W. Evert, Detroit, Mich., assignor to United States Rubber Company, New York, N. Y., a corporation of New Jersey Application March 21, 1945, Serial No. 583,871

1 Claim. (Cl. 33—178)

This invention relates to an extremely simple apparatus for measuring the diameter of the tread of tires in the plane of the wheel.

The larger trucks and buses now travelling the highways are commonly provided with dual tires; that is two pneumatic tires for each rear wheel. It is extremely important that the two tires for the same wheel when properly inflated shall have the same diameter, for if one of the dual tires is only half an inch larger in diameter than the other, it will carry by far the greater portion of the load upon that wheel, and as a result will be subjected to excessive wear since it carries most of the load which should be borne equally by the two tires.

The importance of matching dual tires as to size has been stressed heretofore, and it has been proposed to use a tire diameter caliper adapted to span the tire and measure its size, but it is very difficult for one person alone to measure the diameter of a tire with a caliper because of the length of the same required to span a large tire. Furthermore the inner dual tire is more or less inaccessible, and in the case of buses both tires may be covered by a fender which prevents the use of such a caliper. It has also been proposed heretofore to jack up a wheel of the vehicle equipped with dual tires and determine the size of each tire on that wheel by placing a steel tape around the periphery of the tread of a tire to measure its circumference, and then similarly measure the other tire to determine how closely they are matched as to size, but this is a difficult and time consuming measuring operation.

The present invention contemplates an extremely simple and practical tire measuring device whereby the diameter of a tire may be determined by simply measuring the arc of a portion of the circle defined by the tire tread.

The construction and operation of the present tire measuring device will be more fully understood from the following description when read in connection with the accompanying drawing wherein:

Fig. 1 is a perspective view of a tire measuring device such as contemplated by the present invention.

Fig. 2 is a rear view of a right rear truck or bus wheel equipped with dual tires, and showing the measuring device of the present invention associated with one of the tires; and Fig. 3 is a side view of the wheel of Fig. 2 having the present tire measuring device associated with the outer tire.

Truck and bus tires in dual use may range in size from about 26 to 58 inches in outside diameter of the tread. A single tire measuring stick or measuring device such as contemplated by the present invention and constructed as shown in Fig. 1 may be used to determine the diameter of tires throughout this wide range, and such a stick may be less than three feet long. The measuring stick shown in Fig. 1 of the drawing may be formed throughout of either metal or wood, the latter being preferable in many cases because it will be light to handle and inexpensive to manufacture.

The present measuring device as shown comprises a straight bar or stick 10 which is provided with a curved laterally extending end or projection 11 having the head 12 rigidly secured thereto. The stick 10 is conveniently formed of plywood and the head 12 is formed of a block of hard wood slotted as shown to receive the curved end 11 to which it is secured by glue and pins.

The stick 10 is provided near its other end with the graduations 13 and has slidably mounted thereupon the wooden block 14 forming a lateral projection. This block is provided with a slot 15 adapted slidably to receive the stick 10, and the outer end portion of such slot is closed by the bearing block 16 which is rigidly secured in place by glue and pins. At the bottom of the slot 15 is provided a drill hole adapted to receive the downwardly bent end of the blade spring 17. The body portion of this spring bears yieldingly against one edge of the stick 10 and holds the block 16 in firm contact with the other edge of the stick. After the sliding block 14 is mounted upon the stick 10 as shown with the spring 17 in place, a protruding pin 18 is provided near the end of the stick so as to prevent the block 14 from sliding off the stick. The stick may also be provided with a hole 19 adapted to receive a nail when it is desired to hang the measuring stick upon the wall when it is not in use.

Fig. 2 shows a truck or bus wheel 20 equipped with the dual tires 21 and 22. As shown the inner tire 21 is slightly larger than the outer tire 22 and as a result the inner tire is carrying the entire load as the outer tire does not contact the ground G.

In order to determine the diameter of a tire in accordance with the present invention all that is necessary is to place the measuring stick 10 against the tread of the tire so that it rests as a tangent on the tire tread as indicated by 1 in Fig. 3, and then it is rocked slightly in this position until the block 12 at the curved end of the stick engages the tire tread at 2.

While the stick is in this position the block 14 is slid along the stick 10 until it also engages the tire tread as indicated by 3. When the gauge is so positioned it engages the tire tread at the points 1, 2 and 3 which constitutes three points of an arc of the circle defined by the outer tire tread.

The length of the fixed projection at one end of the stick 10 is indicated by $x$ in Fig. 3 and the length of the sliding projection 14 is indicated by $y$. That is $x$ and $y$ are fixed lateral distances from the stick 10 and define an arc of a predetermined depth upon the tire tread. The length of this arc is determined by the distance between the contact points 2 and 3. The diameter of the tire having this measured arc is determined by reading the graduations 13 at the longer edge of the block 14.

It will be seen from the foregoing that in order to use the measuring device or measuring stick contemplated by the present invention, it is necessary to have access to only a small portion of the tire circumference as will be apparent from Fig. 3, and as soon as the measuring stick has been positioned as shown in Fig. 3 so as to secure contact with the tire tread at the points 1 and 2 the block 14 is slid along the stick 10 until contact is secured at the point 3. The size of the tire being tested may then be read directly from the scale 13 by noting the reading at the edge of the block 14. In this way dual tires upon a wheel may be easily and quickly measured to see if they are properly matched as to diameter.

Having thus described my invention, what I claim and desire to protect by Letters Patent is:

A tire measuring device for determining the diameter of the tread of a tire in the plane of the wheel, comprising a graduated bar adapted to rest with one edge tangent to the tire tread in surface contact therewith and having a fixed lateral projection from said edge at one end that is provided with a tire contact point for engaging the tire tread and a movable lateral projection slidably mounted on the bar near its other end and having a tire contact point, the slidably mounted projection being adapted to slide along the bar until its contact point engages the tire tread, whereupon when the said edge and two points engage the tire the diameter of the tire tread can be determined by reading the position of the sliding projection relative to said graduations.

RALPH W. EVERT.